No. 710,562. Patented Oct. 7, 1902.
P. DE CATERS.
PNEUMATIC TIRE FOR VEHICLE WHEELS.
(Application filed Oct. 22, 1901.)
(No Model.) 2 Sheets—Sheet 1.
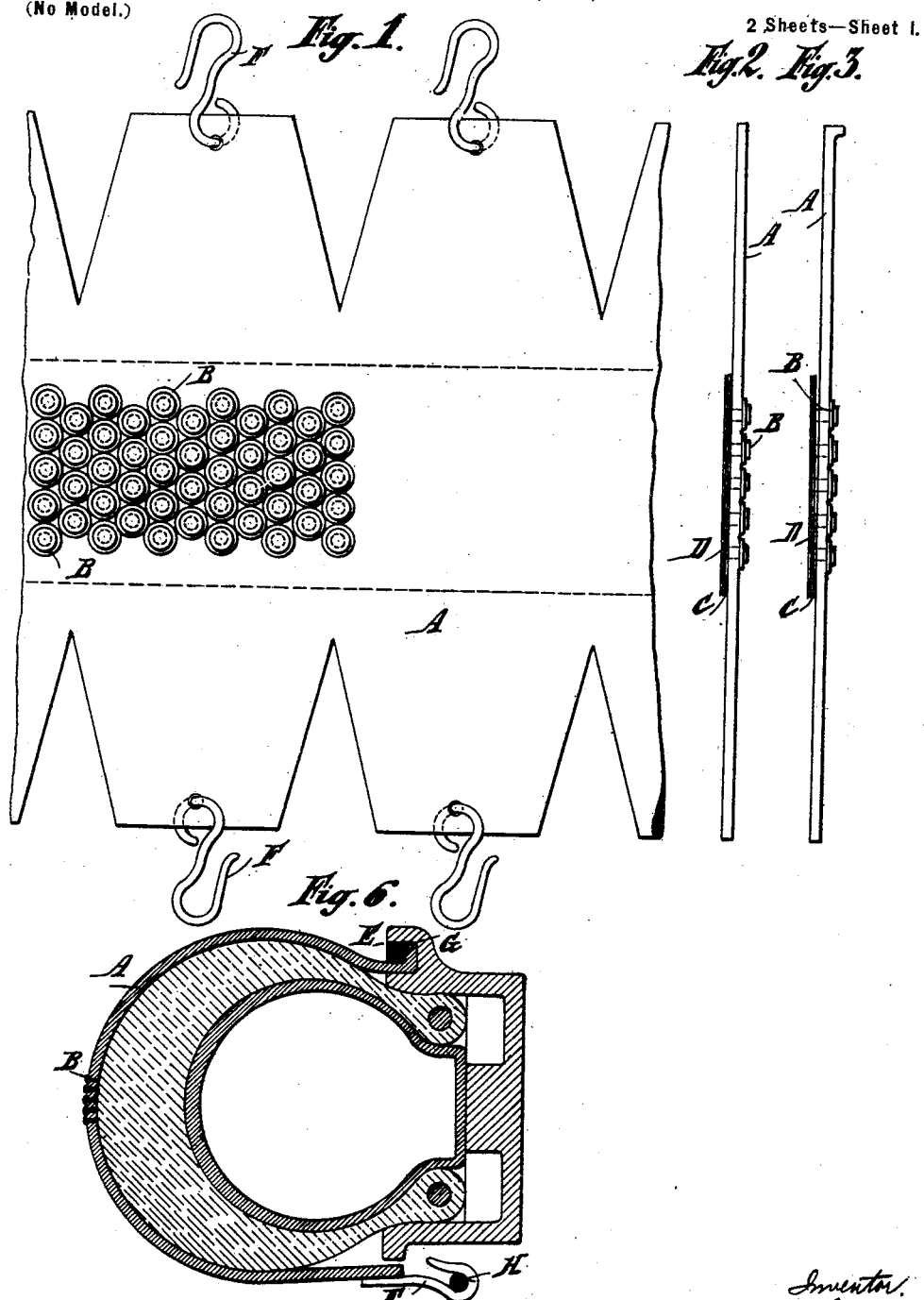

No. 710,562. Patented Oct. 7, 1902.
P. DE CATERS.
PNEUMATIC TIRE FOR VEHICLE WHEELS.
(Application filed Oct. 22, 1901.)
(No Model.) 2 Sheets—Sheet 2.
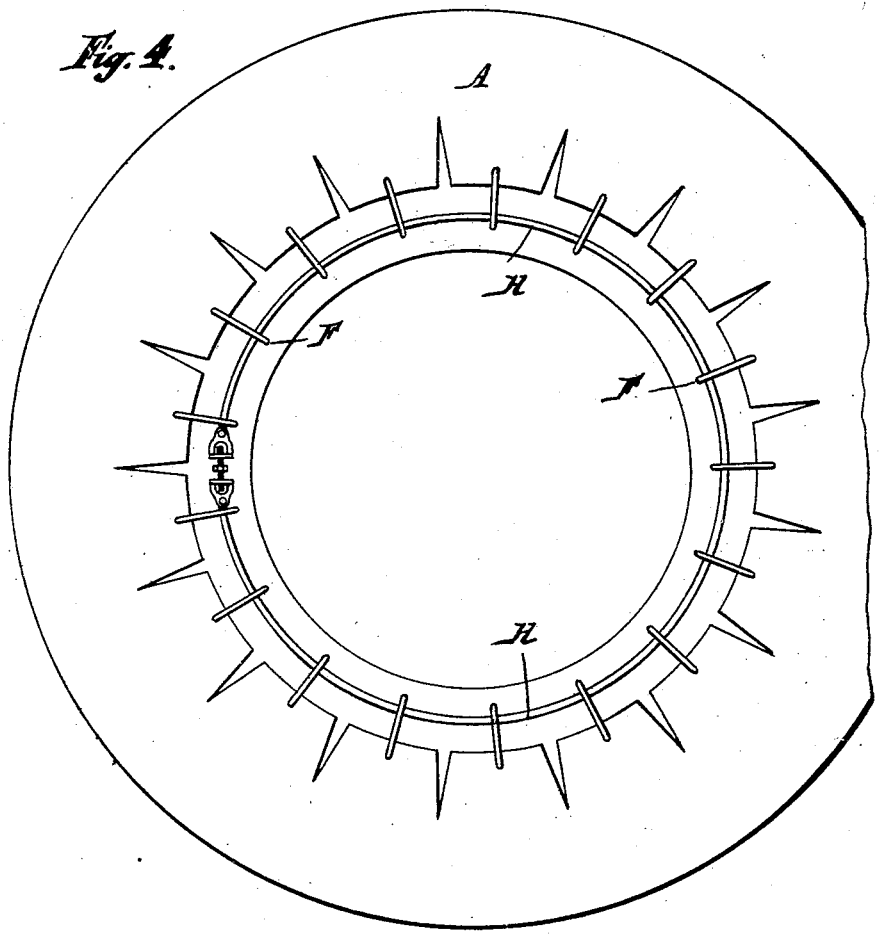
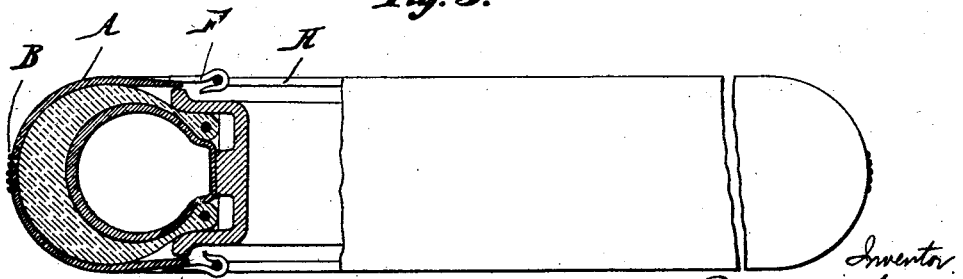

UNITED STATES PATENT OFFICE.

PIERRE DE CATERS, OF BERCHEM, NEAR ANTWERP, BELGIUM.

PNEUMATIC TIRE FOR VEHICLE-WHEELS.

SPECIFICATION forming part of Letters Patent No. 710,562, dated October 7, 1902.

Application filed October 22, 1901. Serial No. 79,532. (No model.)

*To all whom it may concern:*

Be it known that I, PIERRE DE CATERS, a citizen of the Kingdom of Belgium, residing at Berchem, near Antwerp, Belgium, have invented certain new and useful Improvements in Pneumatic Tires for Vehicle-Wheels; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to tires for vehicle-wheels, and has for its object to provide an improved non-slipping outer cover for pneumatic tires which may be readily attached.

My improved cover consists of a band of leather or analogous material with an external tread-surface formed of rivets with simple or double heads or of riveted plates of non-oxidizable metal. The tread-surface thus formed serves both as a protecting and a non-slipping cover. The cover may be readily attached and removed by the means hereinafter described in detail, with reference to the accompanying drawings.

Figure 1 shows a plan view of a portion of my improved cover. Fig. 2 is a cross-section of same. Fig. 3 is a cross-section of a slightly-modified form. Fig. 4 is a side elevation of a pneumatic wheel furnished with my improved cover. Fig. 5 is an edge view, partly in section, of same. Fig. 6 is a cross-section of a wheel furnished with the cover, showing the manner of fixing the same in position.

The body part of the cover is made of a single piece of leather prepared in such a manner as to be as much as possible proof against the influences of temperature and water. This piece A is serrated at equal intervals along the edges on both sides. The middle portion of the cover A is provided with rivets B or small riveted plates of non-oxidizable metal and forming the tread, the said rivets or plates being placed against one another. The rivets pass through the thickness of the piece A (see Fig. 2) and are finally secured in position by a counter-piece applied to the inner side of the piece A. The surface formed by the succession of rivet ends is covered with an armored rubber strip C—that is to say, a strip of rubber in the thickness of which is secured a narrow mesh of metallic netting—although in some cases I may limit myself to the use of one or two surfaces of metallic netting with an intermediate layer and without rubber over all. Between the rubber strip and the metallic netting and the piece A, I place a canvas lining which may be cemented to the rivets, the said canvas strip not being in direct contact either with the strip C or with the metallic netting. The direct contact between the said parts is obviated by rubbing the surface of the canvas with powdered talc or by introducing a layer in the form of sheets of mica or other material with insulating properties or otherwise. The lining C or the metallic netting is also kept out of contact with the air-tube by placing a layer D, of chamois leather or velveteen or the like. It will be obvious that a cover thus constructed will be capable of effectively resisting injuries, shocks, or punctures which may be caused by the road.

The means for adapting and fixing the cover to the wheel-rim is shown in Figs. 4 and 6.

My improved means of securing the cover renders its attachment to the wheel perfectly safe under all conditions. It cannot slip or rub, while at the same time it may be readily attached or detached from the rim.

As already mentioned, the edges of the cover A are formed with serrations at regular intervals. Between each of these intervals along the edges are provided hooks F. The outer ends of the hooks (see Fig. 4) are designed to be hooked onto a ring-wire H, fitted with a suitable tightening device.

After the cover has been placed on the wheel it is tightened by means of the stretching device, which in tightening produces a lateral tension on the hooks F, and thus causes the latter to pull the edges of the cover over the sides in a central direction in proportion as the circumference of the ring H is reduced by the effort exerted upon the said stretching device. This mode of fixing may be applied to any existing wheel.

The cover is incapable of shifting in any direction, and on becoming slack it can easily be stretched anew by means of the stretching device.

In practice and for wheels in which the rim is specially constructed for the adaptation of my improved cover the latter is provided with hooks on one side only, and the other edge thereof is introduced in a recess E, provided in a swelling formed on the rim, (see Fig. 6,) and is there firmly secured by means of a metallic ring or otherwise conveniently adapted to produce a tension on the said edge when tightened by a stretching device or by other appropriate means. This arrangement provides a sort of hinge, by reason of the more or less flexible nature of the material of the cover. The other edge of the cover A, provided with the hooks, is fixed in the manner previously described.

In order to remove the cover, it is only necessary to loosen the rings G and H by unscrewing the stretching device, so as to allow of unfastening the hooks F and the projecting edge lodged in the recess E.

Having now particularly described and ascertained the nature of my said invention and in what manner the same is to be performed, I declare that what I claim is—

1. A protective covering for pneumatic tires comprising an endless sheet or strip of flexible non-extensible material, having perforated radial edge projections and an armored tread composed of a plurality of metallic headed studs, and a textile backing secured to the inner side of said tread, in combination with a tension-ring, and hooks pivoted in said perforations and hooked to said ring, for the purpose set forth.

2. A protective covering for pneumatic tires comprising an endless strip of flexible non-extensible material, having perforated radial edge projections and an armored tread composed of a plurality of solid metallic headed studs, a canvas strip cemented to the inner ends of studs, in combination with an adjustable tension-ring, and hooks pivoted in said perforations and hooked to said ring, for the purpose set forth.

3. A protective covering for pneumatic tires comprising an endless strip of flexible non-extensible material, having perforated radial edge projections and an armored tread composed of a plurality of separate solid metallic headed studs, a canvas cemented to the inner ends of said studs, a metallic netting secured to the canvas and a rubber strip secured to said netting, in combination with a tension-ring, and hooks pivoted in said perforations and hooked to said ring, for the purpose specified.

In testimony that I claim the foregoing as my invention I have signed my name in presence of two subscribing witnesses.

PIERRE DE CATERS.

Witnesses:
HENRI RACLOT,
GREGORY PHELAN.